T. SHAW.
Steam Gage-Cock.
No. 8,773. Reissued June 24, 1879.
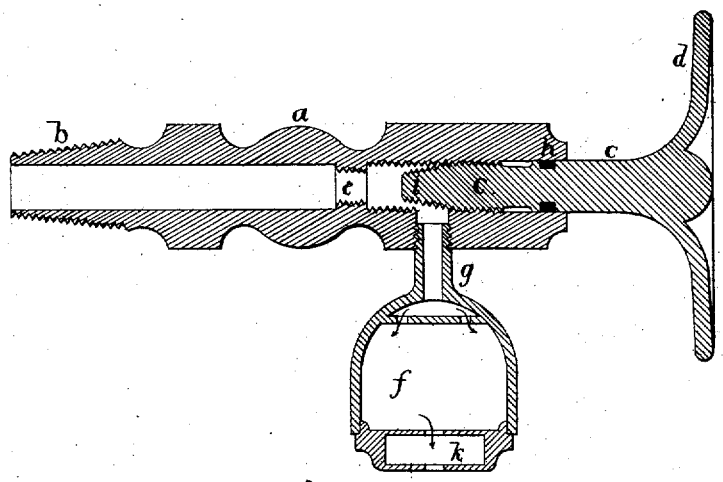
Attest:
Courtney A. Cooper
William Paxton.
Inventor:
Thomas Shaw
By his attorney
Charles E. Foster
N. PETERS, PHOTO-LITHOGRAPHER, WASHINGTON, D. C.

UNITED STATES PATENT OFFICE.

THOMAS SHAW, OF PHILADELPHIA, PENNSYLVANIA.

IMPROVEMENT IN STEAM-GAGE COCKS.

Specification forming part of Letters Patent No. 65,018, dated May 21, 1867; Reissue No. 8,773, dated June 24, 1879; application filed October 11, 1867.

*To all whom it may concern:*

Be it known that I, THOMAS SHAW, of the city and county of Philadelphia, Pennsylvania, have invented a new and Improved Steam-Gage Cock; and I hereby declare the following to be a full, clear, and exact description of the same, reference being had to the accompanying drawings, and to the letters of reference marked thereon.

My invention consists in providing a gage-cock with a whistle, so situated that the discharge-fluid shall pass through the same, indicating its character.

On reference to the drawing, forming part of this specification, the same represents a longitudinal vertical section of a valve-cock adapted for use with a steam-generator as a gage.

The barrel *a* is provided with a threaded end, *b*, and has a central opening contracted at *e*, and threaded at the outer end for the reception of the threaded valve-stem *c*, at the outer end of which is a hand-wheel, *d*.

The stem *c* has an annular groove for the reception of a packing, *h*, thus dispensing with the ordinary follower-cap. The inner end of the stem *c* is tapered, forming a valve, *i*, upon which is cut a screw-thread, adapted to a corresponding thread in the contracted throat or seat *e* of the barrel.

When the valve is forced into its seat the opening is tightly closed, and I have found that a valve of this character will more effectually close the channel against fluids under high pressure than ordinary ground valves; that leakage is not apt to occur from the wearing of the surfaces, and that the cost of construction is much less.

In using the ordinary gage-cocks it is impossible for unskilled attendants, and very difficult for experts, to determine from the sound whether the fluid passing through the cock is steam, foam, or water. I have ascertained that by combining a whistle with the cock the character of the fluid can at once be determined, and the height of the water in the boiler thus indicated. The passage of water will be accompanied with but little noise, foam will make a peculiar sound readily recognized, while the passage of steam will produce a shrill, clear note, giving immediate alarm and indicating the insufficiency of water.

The whistle *g* is detachable from the barrel, and provided with a partition, *i*, with peripheral holes to avoid a central current, and with chambers *f* and *k* for imparting the needed vibrations to the fluid.

I do not here claim the construction of the valve; but

I claim—

The combination, with a gage-cock, of a whistle secured at the outlet thereof, so that the fluids discharged through the cock will pass therefrom through the whistle, substantially as set forth.

THOMAS SHAW. [L. S.]

Witnesses:

ELIAS J. SHAW,

E. COBB.